United States Patent
Park et al.

(10) Patent No.: US 7,292,208 B1
(45) Date of Patent: Nov. 6, 2007

(54) REARVIEW VIDEO OUTPUT DEVICE

(75) Inventors: Eric Park, Rowland Heights, CA (US);
Jung Ho Son, Stevenson Ranch, CA (US)

(73) Assignee: SAVV Corporation, Cerritos, CA (US)

( * ) Notice: Subject to any disclaimer, the term of this patent is extended or adjusted under 35 U.S.C. 154(b) by 311 days.

(21) Appl. No.: 10/309,471

(22) Filed: Dec. 4, 2002

(51) Int. Cl.
*G09G 5/00* (2006.01)

(52) U.S. Cl. .............................. 345/8; 345/2.1; 345/55; 345/87; 345/92; 345/630

(58) Field of Classification Search .................... 345/8, 345/2.1, 55, 87, 92, 630; 359/630
See application file for complete search history.

(56) References Cited

U.S. PATENT DOCUMENTS

| | | | |
|---|---|---|---|
| 4,499,451 A | 2/1985 | Suzuki et al. | |
| 4,630,904 A | 12/1986 | Pastore | |
| 4,701,022 A * | 10/1987 | Jacob | 359/603 |
| RE32,576 E | 1/1988 | Pastore | |
| 4,718,756 A * | 1/1988 | Lancaster | 359/855 |
| D299,491 S | 1/1989 | Masuda | |
| 4,882,565 A | 11/1989 | Gallmeyer | |
| 5,037,182 A | 8/1991 | Groves et al. | |
| 5,289,321 A | 2/1994 | Secor | |
| 5,303,205 A | 4/1994 | Gauthier et al. | |
| 5,416,313 A | 5/1995 | Larson et al. | |
| 5,566,224 A | 10/1996 | Azam et al. | |
| 5,631,638 A | 5/1997 | Kaspar et al. | |
| 5,793,308 A | 8/1998 | Rosinski | |
| 5,940,120 A | 8/1999 | Frankhous et al. | |
| 5,956,181 A * | 9/1999 | Lin | 359/630 |
| 6,106,121 A | 8/2000 | Buckley et al. | |
| 6,124,886 A | 9/2000 | DeLine et al. | |
| 6,249,310 B1 * | 6/2001 | Lefkowitz | 348/151 |
| 6,268,837 B1 * | 7/2001 | Kobayashi et al. | 345/1.1 |
| 6,357,883 B1 | 3/2002 | Strumolo et al. | |
| 6,382,805 B1 * | 5/2002 | Miyabukuro | 359/872 |
| 6,386,742 B1 | 5/2002 | DeLine et al. | |
| 6,412,959 B1 | 7/2002 | Tseng | |
| 6,447,128 B1 | 9/2002 | Lang et al. | |
| 6,690,268 B2 * | 2/2004 | Schofield et al. | 340/438 |

(Continued)

FOREIGN PATENT DOCUMENTS

| | | |
|---|---|---|
| EP | 0830 985 A1 | 3/1998 |
| EP | 1106435 A1 | 6/2001 |
| EP | 0830985 B1 | 6/2002 |
| JP | 03-052097 * | 3/1991 |
| WO | WO 01/64481 A2 | 9/2001 |
| WO | WO 01/64481 A3 | 9/2001 |
| WO | WO 02/49881 A1 | 6/2002 |

*Primary Examiner*—Richard Hjerpe
*Assistant Examiner*—Leonid Shapiro
(74) *Attorney, Agent, or Firm*—Seyfarth Shaw LLP

(57) ABSTRACT

The invention is a rearview video-output device with a cover, a transparent plate mounted into the cover with at least one video output device and at least one audio output device located within the cover. A cable provides a means for inputting at least one video signal, at least one audio signal and electric power. A means for attaching the cover to the center rearview mirror is provided. A sheet is located behind the transparent plate and within the cover. The sheet enhances the reflectivity of the transparent plate by providing a uniform background color and texture. The sheet is sized to permit pass through installation of each video output device. The device does not limit video clarity and brightness. The abstract is submitted with the understanding that it will not be used to interpret or limit the scope or meaning of the claims.

18 Claims, 5 Drawing Sheets

U.S. PATENT DOCUMENTS

| | | |
|---|---|---|
| 6,779,900 B1 * | 8/2004 | Nolan-Brown ............... 359/871 |
| 6,845,805 B1 * | 1/2005 | Koster ........................ 160/236 |
| 2001/0002771 A1 | 6/2001 | O'Farrell et al. |
| 2002/0012173 A1 | 1/2002 | Aoki et al. |
| 2002/0092958 A1 * | 7/2002 | Lusk ........................... 248/339 |
| 2002/0133144 A1 * | 9/2002 | Chan et al. .................... 606/4 |
| 2003/0156193 A1 * | 8/2003 | Nakamura ................... 348/148 |
| 2004/0004378 A1 * | 1/2004 | Park et al. ................ 297/217.3 |

* cited by examiner

REARVIEW VIDEO OUTPUT DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

FIELD OF INVENTION

The present invention relates generally to the field of vehicle accessories and more particularly to the field of a clip-on vehicle rearview video output device.

BACKGROUND OF THE INVENTION

Prior devices mount a displayer behind a two-way mirror. The two-way mirror configuration distorts the image produced by the video displayer.

A two-way or transparent mirror is a transparent plate coated with a thin layer of reflective material, like aluminum. The device functions as a mirror when the interior side of the two-way mirror is much darker than the exterior side. The mirror becomes more transparent when the interior side of the mirror becomes brighter relative to the exterior. Activation of the video displayer facilitates this change.

The thin layer of reflective film prevents the mirror from becoming fully transparent. The reflective layer is translucent. The translucent film transmits light in such a way that objects behind it cannot be clearly perceived. The two-way mirror tends to darken and distort video images transmitted through it. Therefore, image clarity and brightness are lost, especially during daylight viewing.

What is needed is a device that does not limit viewing clarity and brightness.

BRIEF SUMMARY OF THE INVENTION

The invention resides in a clip-on rearview video-output device. The rearview video-output device includes a cover. The cover has an opening on its backside. A transparent plate is mounted in the backside opening of the cover. At least one video output device is located behind the transparent plate and within the cover. At least one audio output device is located within the cover. A cable provides a means for inputting at least one video signal, at least one audio signal and electric power. The cable may be either a 5-pin or an 8-pin DIN cable. A DIN cable is commonly used for audio and control applications. A means for attaching the cover to the center review mirror is provided.

The interior background of the transparent plate is much darker than the exterior. The dark background combines with the transparent plate to make a highly reflective surface, the same way an exterior window of a darkened room has greater reflectivity that the exterior window of a brightly lit room. The reflectivity of the transparent plate in front of the video output device is eliminated when it is turned on. The images produced by the video-output device are clearly transmitted through the transparent plate while the rest of the transparent plate remains highly reflective. The transparent plate does not darken or distort the transmitted image.

In a first variation of this invention, a sheet is located behind the transparent plate and within the cover. The sheet enhances the reflectivity of the transparent plate by providing a uniform background color and texture. The sheet is sized to permit pass through installation of each video output device.

In a variant of this invention, the transparent plate is flat.

In another variant of this invention, the means for attaching the cover to the center rearview mirror comprises at least one attachment strap.

In yet another variant of this invention, the means for attaching the cover to the center rearview mirror further comprises bonding the cover to the center rearview mirror. At least one pad with a first side and a second side is employed. The first side is adhered to the cover and the second side is adhered to the center rearview mirror.

In again another variant of this invention, the means for attaching the cover to the center rearview mirror includes at least one cantilevered upper hook. It may also include at least one cantilevered lower hook.

In a variation of this invention, the at least one cantilevered, upper hook can be fixed or use a spring or biasing means to move the hook into contact with the center rearview mirror. The at least one cantilevered, lower hook can also be fixed or biased.

In still another variant of this invention, the at least one cantilevered, upper hook is shaped to extend over the center rearview mirror and attach to the rear view mirror support post.

In another variation of this invention, the sheet is opaque. Reflectivity is increased when the sheet is a dark color, like black.

In still another variation of this invention, the transparent plate has an anti-glare exterior surface coating. The coating diffuses and reduces the brightness of the exterior light entering the device through the transparent plate so that the video output device remains clearly visible.

In yet another variation of this invention, the video output device is an active matrix TFT LCD monitor. The monitor is capable of displaying an input signal from at least one video camera mounted on the outboard of the vehicle, at least one video camera mounted on the inboard of the vehicle, a commercial television broadcast, a DVD output, a global positioning mapping information or a video tape output. The monitor is remote controlled.

In even another variation of this invention, the cable is attached to a center review mirror support post.

In even a further variation of this invention, the interior surface of the cover, the at least one video output device, the at least one audio output device and the cable are black.

The foregoing has outlined the more pertinent and important features of the present invention in order that the detailed description of the invention that follows may be better understood so the present contributions to the art may be more fully appreciated. Additional features of the present invention will be described hereinafter, which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

The invention will be more fully understood by reference to the following drawings that are for illustrative purposes only:

FIG. 4 is a rear view of the invention with the monitor turned on;

DETAILED DESCRIPTION

Figure 1:
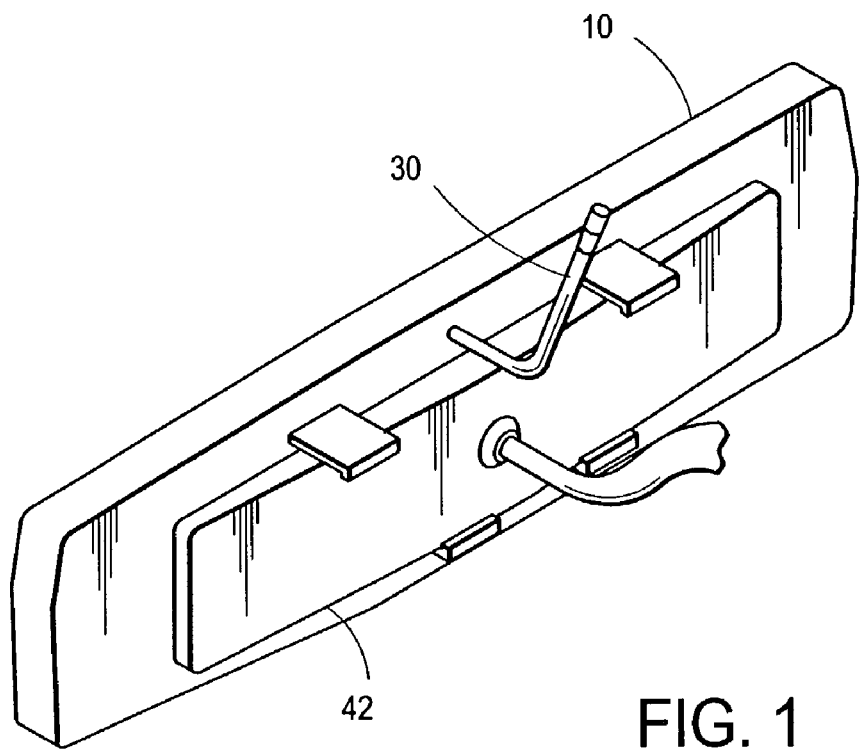
FIG. 1 is an orthogonal view showing the invention attached to a center rearview mirror.
Figure 2:
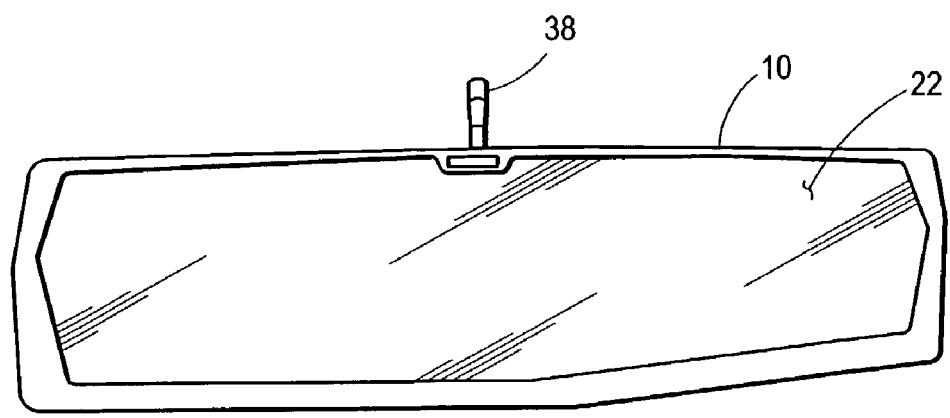
FIG. 2 is a rear view of the invention.
Figure 3:
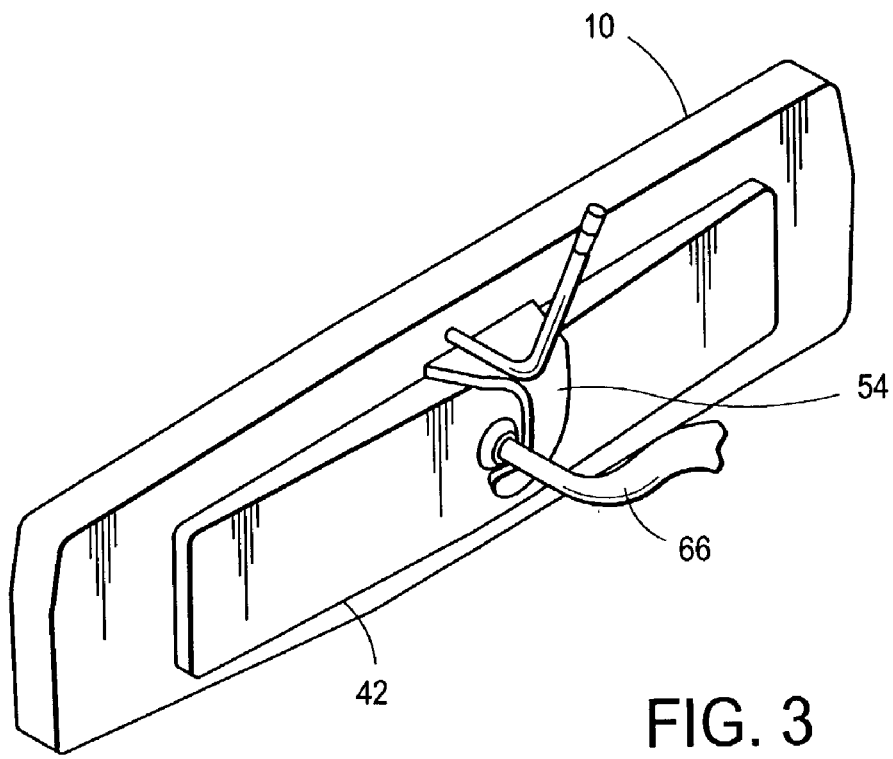
FIG. 3 is an orthogonal view showing the invention attached to a center rearview mirror.
Figure 4:
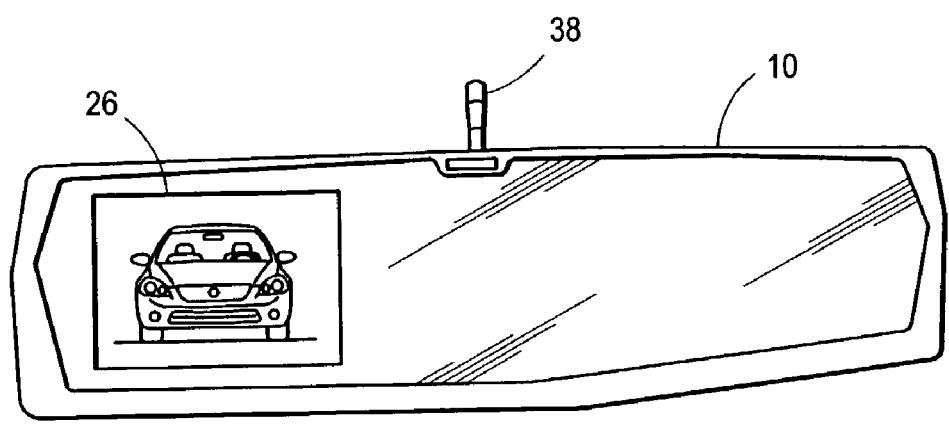
Figure 5:
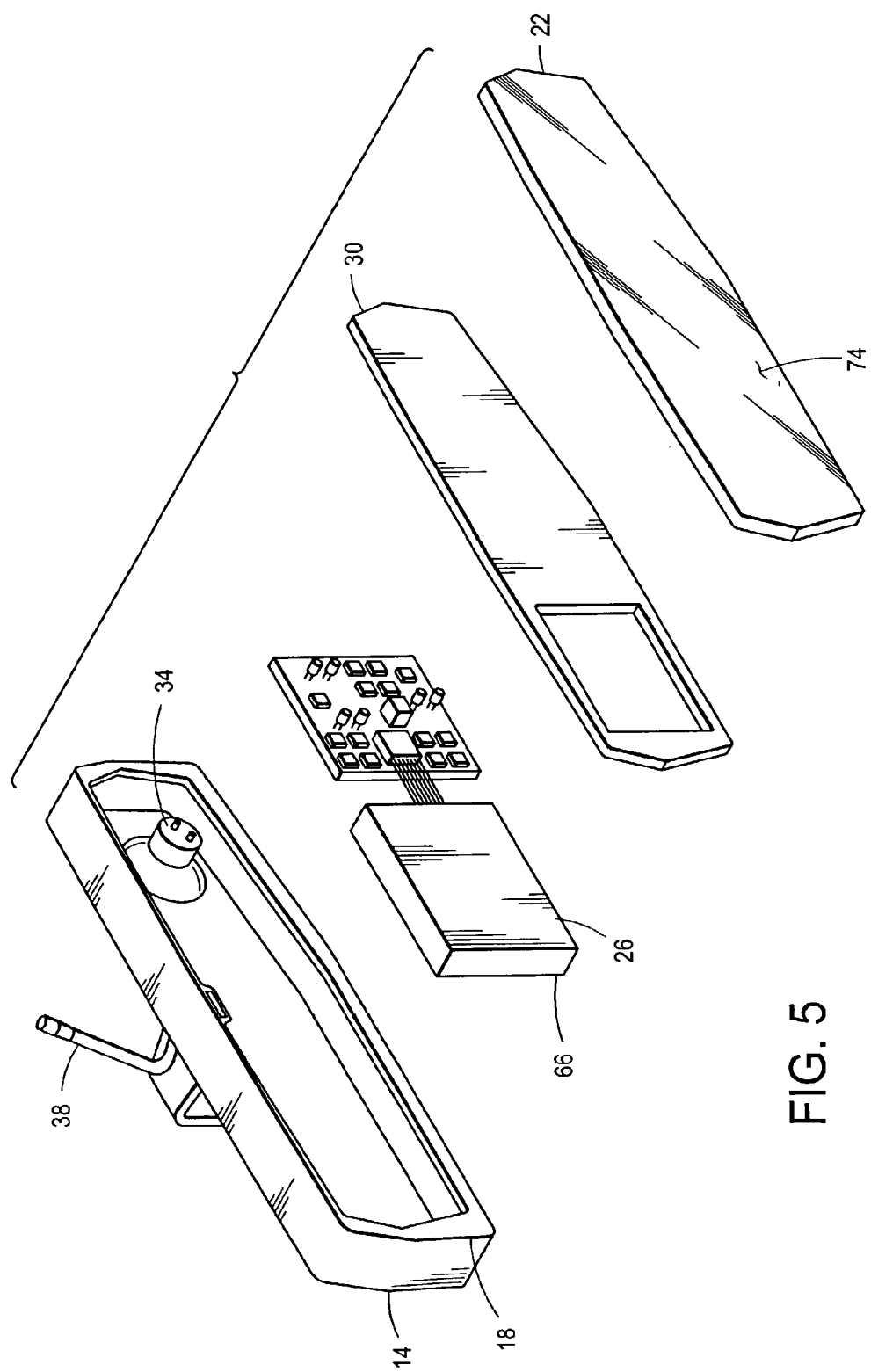
FIG. 5 is an exploded orthogonal view of the invention.

The invention resides in a rearview video-output device. As shown in FIGS. 1, 3 and 5, the rearview video-output device 10 includes a cover 14. The cover 14 has an opening on its backside 18. A transparent plate 22 is mounted into the backside opening 18 of the cover 14. At least one video output device 26 is located behind the transparent plate 22 and within the cover 14. At least one audio output device 34 is located within the cover 14. A cable 38 provides a means for inputting at least one video signal, at least one audio signal and electric power. The cable 38 can be either a 5-pin or an 8-pin DIN cable. A DIN Cable is commonly used for audio and control applications. A means for attaching the cover 14 to the center rearview mirror 42 is provided.

The interior background of the transparent plate 22 is much darker than the exterior. The dark background combines with the transparent plate 22 to make a highly reflective surface, the same way an exterior window of a darkened room has greater reflectivity than that of the exterior window of a brightly lit room. The reflectivity of the transparent plate in front of the video output device is eliminated upon being turned on. The images produced by the video-output device are clearly transmitted through the transparent plate while the rest of the transparent plate 22 remains highly reflective. The transparent plate 22 does not darken or distort the transmitted image.

Cover 14 fabrication materials include plastic, acrylic, Polyvinyl Chloride (PVC), Polyethylene Terephthalate (PET), polystyrene (PS), metal, wood, fabric, carbon epoxy composite or propylene and polypropylene (PP).

Transparent plate 22 fabrication materials include plastic, polycarbonate and glass.

In a first variation of this invention, shown in FIG. 5, a sheet 30 is located behind the transparent plate 22 and within the cover 14. The sheet 30 enhances the reflectivity of the transparent plate 22 by providing a uniform background color and texture. The sheet 30 is sized to permit pass through installation of each video output device 26.

Sheet 30 fabrication materials include plastic, acrylic, Polyvinyl Chloride (PVC), Polyethylene Terephthalate (PET), polystyrene (PS), propylene and poly propylene (PP), polycarbonate, paperboard, cloth, metal, wood, carbon epoxy composite or cardboard.

In a variant of this invention, the transparent plate 22 is flat.

Figure 9:
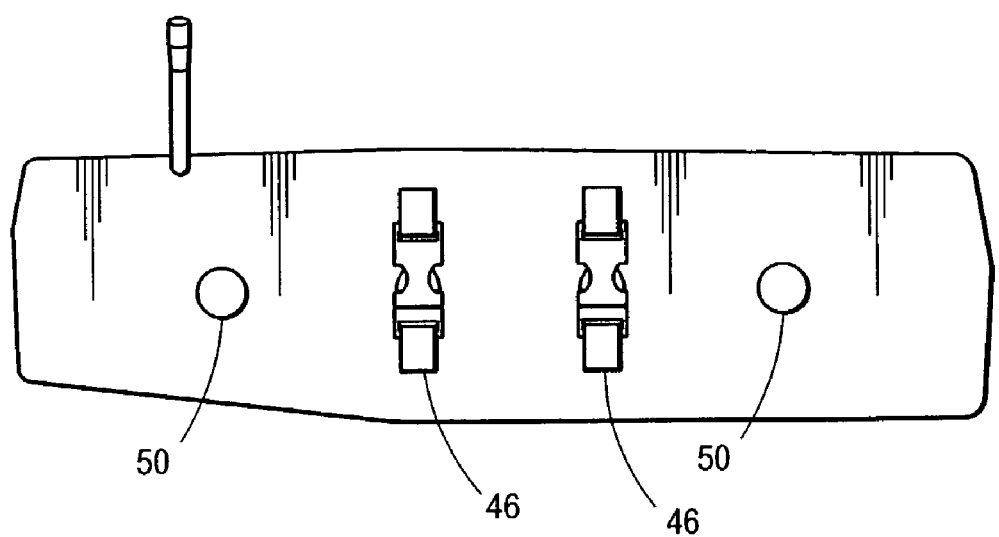
FIG. 9 is a front view of the invention showing the adjustable attachment straps attached to the cover.

In another variant of this invention, the means for attaching the cover 14 to the center rearview mirror cover 42 comprises at least one attachment strap 46, as shown in FIG. 9.

In yet another variant of this invention, the means for attaching the cover 14 to the center rearview mirror 42 further comprises bonding the cover 14 to the center rearview mirror 42, as shown in FIGS. 6-9. At least one pad 50 with a first side and a second side is employed. The first side is adhered to the cover 14 and the second side is adhered to the center rearview mirror 42.

In again another variant of this invention, shown in FIGS. 1, 3, 6 and 8, the means for attaching the cover 14 to the center rearview mirror 42 includes at least one cantilevered, upper hook 54. It may also include at least one cantilevered, lower hook 58.

Figure 6:
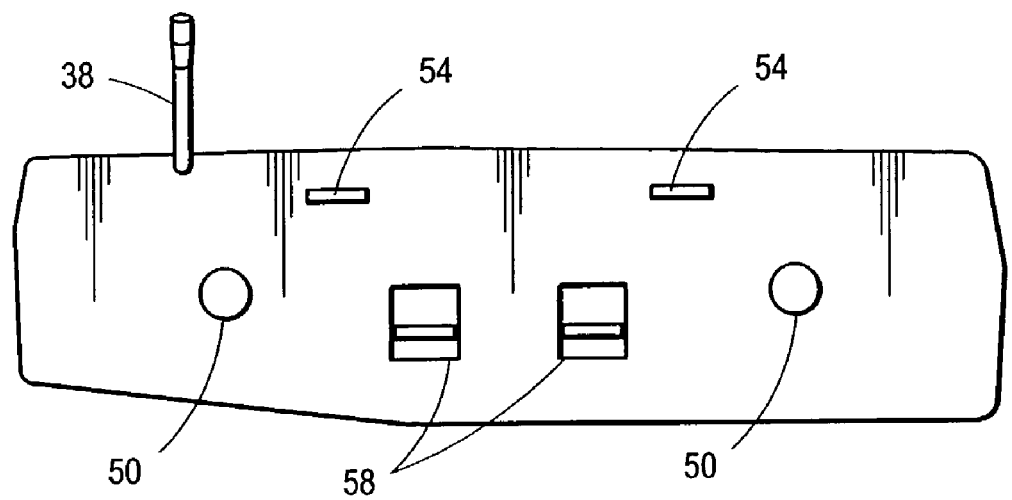
FIG. 6 is a front view of the invention showing fixed upper and slideable lower cantilevered hooks attached to the cover.
Figure 8:
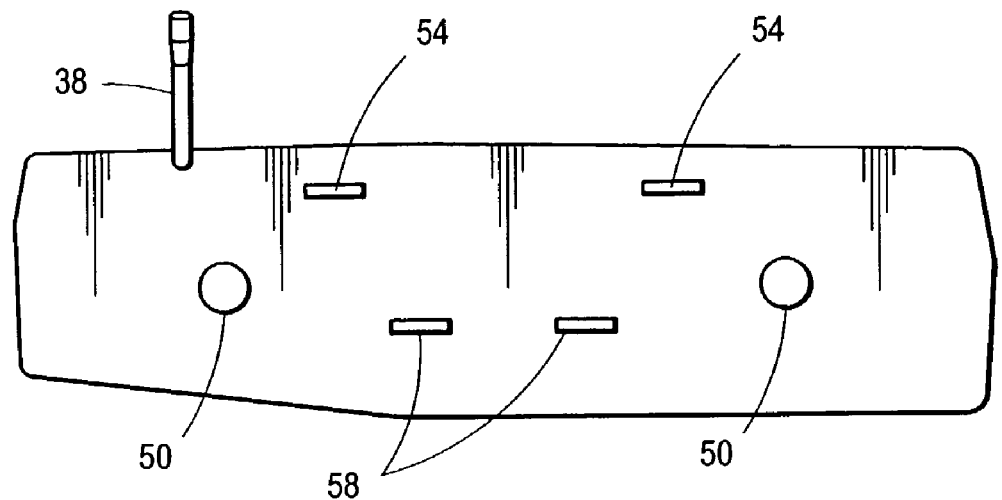
FIG. 8 is a front view of the invention showing the arrangement of the pivoting upper and lower cantilevered hooks attached to the cover.

In a variation of this invention, the at least one cantilevered, upper hook 54 can be fixed or use a spring or biasing means to tilt or slide the hook 54 into contact with the center rearview mirror 42. This configuration is shown in FIGS. 6 and 8. The biased hook 54 slides along a track or pivots about a hinge. The track or hinge is mounted into the cover 14. The at least one cantilevered, lower hook 58 can likewise be fixed or biased to slide or tilt the hook 58.

Figure 7:
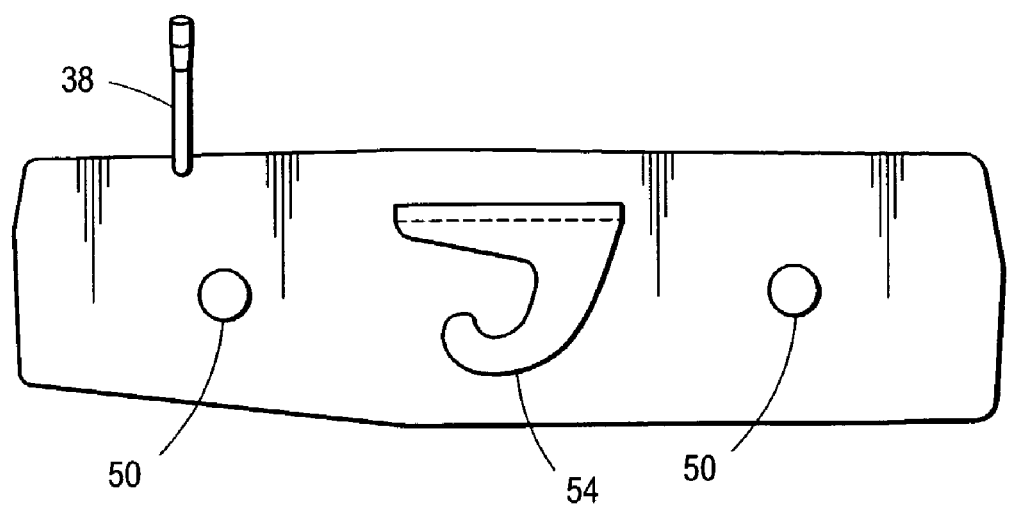
FIG. 7 is a front view of the invention showing the fixed upper cantilevered hook attached to the cover.

In still another variant of this invention, the at least one cantilevered, upper hook 54 is shaped to extend over the center rearview mirror 42 and attach to the rear view mirror support post 62, as shown in FIGS. 3, 5 and 7.

In another variation of this invention, the sheet 30 is opaque. Reflectivity is increased when the sheet 30 is a dark color, like black.

In still another variation of this invention, the transparent plate 22 has an anti-glare exterior surface coating 74, as shown in FIG. 5. The coating diffuses and reduces the brightness of the exterior light entering the device through the transparent plate so that the video output device remains clearly visible.

In yet again another variation of this invention, the video output device 26 is an active matrix 5-inch TFT LCD monitor 66, as shown in FIG. 5. The monitor 66 is capable of displaying input from at least one video camera mounted on the outboard of the vehicle, at least one video camera mounted on the inboard of the vehicle, a commercial television broadcast signal, global positioning mapping information or output from a video tape or DVD device. The monitor 66 is remote controlled.

In even another variation of this invention, the cable 38 is attached to a center rearview mirror post 62 by a clip.

In even further variation of this invention the interior surface 70 of the cover 14, the at one video output device 26, the at least one audio output device 34 and the cable 38 are black.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not only by the embodiments illustrated, but by the appended claims and their legal equivalents.

What is claimed is:

1. A rearview video-output device comprising:
   a cover, said cover having a backside opening;
   a transparent plate mounted into said backside opening;
   at least one video output device located behind said transparent plate and within said cover;
   an opaque sheet located behind said transparent plate and within said cover, said sheet is sized to permit pass-through installation of each of said at least one video output device into the sheet and is a background for the transparent plate to provide a darker color at an interior surface of the transparent plate than at an exterior surface of the transparent plate; and
   means for attaching said cover to a center rearview mirror, wherein said transparent plate is transmissive when said at least one video output device is in an on-state and is reflective when said at least one video output device is in an off-state.

2. A rearview video-output device according to claim 1, wherein said means for attaching said cover comprises at least one attachment strap.

3. A rearview video-output device according to claim 1, wherein said means for attaching said cover further comprises said cover being adhered to said center rearview mirror by an adhesive means.

4. A rearview video-output device according to claim 3, wherein said adhesive means comprises at least one pad with a first side and second side, said first side and said second side are deposited with an adhesive, said first side is adhered to said cover, and said second side is adhered to the center rearview mirror.

5. A rearview video-output device according to claim 1, wherein said means for attaching said cover comprises at least one cantilevered upper hook.

6. A rearview video-output device according to claim 5, wherein said at least one cantilevered upper hook is affixed to said rear video-output device.

7. A rearview video-output device according to claim 5, wherein said at least one cantilevered, upper hook has a biasing means.

8. A rearview video-output device according to claim 5, wherein said at least one cantilevered, upper hook is shaped for extending over the center rearview mirror and attaching to a rear view mirror support post.

9. A rearview video-output device according to claim 1, wherein said means for attaching said cover comprises at least one cantilevered lower hook.

10. A rearview video-output device according to claim 9, wherein said two cantilevered, lower hooks are affixed to said rear video-output device.

11. A rearview video-output device according to claim 9, wherein said at least one cantilevered, lower hook comprises a biasing means.

12. A rearview video-output device according to claim 1, wherein said darker color is black.

13. A rearview video-output device according to claim 1, wherein said transparent plate having an anti-glare exterior surface coating that diffuses and reduces the brightness of exterior light entering through the transparent plate so that the rearview video-output device remains clearly visible.

14. A rearview video-output device according to claim 1, wherein said video output device is an active matrix TFT LCD monitor.

15. A rearview video-output device according to claim 1, wherein said video output device is remote controlled.

16. A rearview video-output device comprising:
    a cover having a backside opening;
    a video output device located behind said transparent plate and within said cover;
    an audio output device located within said cover;
    a cable means for inputting a video signal, an audio signal and electric power;
    a transparent plate mounted in the backside opening, the transparent plate having a first portion directly facing the video output device and a second portion directly facing an opaque background with a dark color; and
    means for attaching the cover to a center rearview mirror, wherein the first portion of the transparent plate is transmissive when the video output device is in an on-state and is reflective when the video output device is in an off-state.

17. A rearview video-output device according to claim 16, wherein the background is a black colored sheet located behind said transparent plate and within said cover.

18. A rearview video-output device according to claim 16, wherein the background is an interior surface of the cover having a black color.

* * * * *